United States Patent Office 3,101,238
Patented Aug. 20, 1963

3,101,238
FAT LIQUORING WITH REACTION PRODUCT OF EPOXIDIZED ESTERS AND POLYBASIC INORGANIC ACIDS
Jürgen Plapper, Dusseldorf, and Gerhard Dieckelmann, Dusseldorf-Holthausen, Germany, assignors to Böhme Fettchemie G.m.b.H., Dusseldorf, Germany, a corporation of Germany
No Drawing. Filed June 7, 1961, Ser. No. 115,332
Claims priority, application Germany June 11, 1960
14 Claims. (Cl. 8—94.23)

This invention relates to the treatment of leather, and more particularly to fat liquoring of leather. The invention relates more specifically to fat liquoring agents which are reaction products of epoxidized esters of fatty acids or alcohols with polyvalent inorganic acids or salts of sulfurous acid.

It is known that in the art epoxidized esters of unsaturated fatty acids or fatty alcohols may be used for leather fatting and that the use of these agents produces light colored leather having a good light fastness. Of special practical interest are epoxidized unsaturated vegetable or animal oils, fats or waxes, such as marine animal oils, which still exhibit an oily consistency even at relatively low iodine numbers. These oils are combined with emulsifiers for the preparation of aqueous fat liquoring emulsions.

It is therefore an object of this invention to produce fat liquoring agents for leather having high water dispersibility.

It is a further object to provide a method of fat liquoring leather with an aqueous fat liquoring emulsion using novel fat liquoring agents wherein emulsifiers are practically unnecessary.

We have now discovered that the leather fat liquoring process can be substantially simplified and improved by using in place of these known epoxidation products their reaction products with polyvalent inorganic acids or with salts of sulfurous acid, which are now accessible through the process of patent application U.S. Serial Number 102,387 or of patent application U.S. Serial Number 102,388, both filed April 12, 1961. Suitable reaction products with polybasic inorganic acids are primarily those of sulfuric acid, phosphoric acid or boric acid or their salts.

These products are characterized by the water solubility or high water dispersibility, so that in the preparation of aqueous fat liquoring emulsions the concurrent use of emulsifiers is practically unnecessary. As a rule, they are used in the form of their water soluble salts with inorganic or organic bases.

The sulfonation products may, for example, be derived from vegetable oils, such as sunflower oil, soy bean oil, beet oil, caster oil, olive oil, linseed oil, animal oils or waxes such as neat's foot, sperm oil, herring oil, cod liver oil, shark oil or whale oil, as well as synthetic oils such as mono-, di- or tri-glycerides of unsaturated fatty acids, such as triolein and of esters of unsaturated fatty alcohols with mono- and poly-basic carboxylic acids, such as propionic acid, oleyl esters, lactic acid oleyl ester, oleic acid oleyl esters, phthalic acid dioleyl esters, etc.

The products may also be derived from unsaturated high molecular hydrocarbons such as squalene. Since the epoxidation leads to products having a light color and a pleasant odor, it is also possible to use as a starting material low quality, dark colored train oils and nevertheless obtain relatively light colored low-odor sulfonation products. Especially useful are sulfonation products which are derived from epoxides having an epoxide oxygen content generally between 0.1 to 3%, preferably 0.8 to 1.5%, and whose iodine numbers are about 20 to 50% of the original value. With increasing epoxidation degree, more viscous end products are obtained which are less liquid. The sulfonation products are obtained by treatment with known sulfonating agents at temperatures of −10 to +40° . For example, they may be adjusted to a pH value of between 6 and 7, preferably 6.5 or 6.8, with the aid of sodium hydroxide, potassium, hydroxide, ammonia, sodium carbonate, dimethylamine, triethanolamine, etc.

In order to obtain readily water emulsifiable products, the sulfation is carried out in general with 8 to 20%, preferably 8 to 15%, of concentrated sulfuric acid. Even within the lower ranges of the amount of sulfuric acid, satisfactorily stable fat emulsions are still obtained. Compared with normal sulfation products of non-epoxidized material, less sulfuric acid is needed to obtain satisfactorily stable emulsions because the sulfation products according to the invention are substantially easier to emulsify. These sulfation products are satisfactorily liquid as well as lower in salt content and are therefore more stable during storage than the normal sulfation products. During storage no sediment separates out at all. In general, the reaction with sulfuric acid takes place below 40° C. and is preferably carried out between 15 and 30° C.

The sulfonation mixtures thus obtained are miscible with water in any desired ratio and form emulsions which are stable against electrolyte additives and which are excellently suitable for fat liquoring all types of leather. Fur skins may also be fat liquored with these emulsions by applying the fat liquoring emulsions to the fleshy side of the skins. It is further possible to incorporate the fat liquoring agents according to the invention into the leather by rubbing or rolling the fat liquoring agent into the leather. The treated leather has an especially good feel and fullness, a light color and a high light fastness.

In place of the sulfonation products or their salts, the corresponding phosphorylation products or their salts may also be used in analogous manner, or also those water soluble or water dispersible reaction products of unsaturated fatty epoxides may be used which may be obtained from the starting epoxidates by treatment with oxygen or oxygen-containing gases and subsequent treatments with salts of sulfurous acid.

The light fastness of the products used in accordance with the invention, and thereby of the treated leather, can be further improved by employing these products together with known epoxidized leather fatting agents according to U.S. Patent Number 2,822,235. For this purpose, for example, 50 to 70 parts by weight of the sulfonation products according to the present invention are admixed with 30 to 40 parts by weight of highly epoxidized vegetable or animal unsaturated oils having an epoxide content of 3 to 10%. However, such mixtures may also be employed in different quantitative ratios. Furthermore, it is also possible to use concurrently other known leather fat liquoring agents, such as sulfonated fats, oils or waxes or fatty acid esters alone or in combination with paraffin oils and the like.

In place of the sulfonation products, it is also possible to use, entirely or partially, the salts of corresponding acid phosphoric acid reaction products with unsaturated fatty epoxides. As a rule, the sulfuric acid reaction products as well as the phosphoric acid reaction products with the epoxide compounds or the above mentioned sulfitation products are used in amounts of 2 to 25%, preferably in amounts of 3 to 10%, based upon the weight of the leather or fur skin.

The following specific examples are given to illustrate our invention and enable persons skilled in the art to better understand and practice the invention and are not intended to be limitative.

Example I

A black colored herring oil of low quality and unpleasant odor, having the characteristic values: acid number=17.2, iodine number=106.9, esterification number=120, hydroxyl number=21.9, was epoxidized in known fashion with hydrogen peroxide in the presence of acetic acid. After working up the reaction mixture, a light yellow, low odor oil was obtained which had the following characteristic values: acid number=15.7, iodine number=70.7, epoxide oxygen content=1.0%. The epoxidized fish oil was sulfonated with 20% sulfuric acid between 25 and 28° C. During the introduction of the sulfuric acid the temperature of the reaction mixture was not allowed to rise above 28° C. After all of the sulfuric acid had been added, it was necessary to stir the reaction mixture for about two hours at the same temperature. The acid ester was washed once or twice with a 10% sodium sulfate solution in the usual manner. Thereafter, the reaction product was adjusted to a pH value of 6.5 to 6.8 by the addition of potassium hydroxide.

The sulfonate thus obtained was admixed in ratio of 70:30 with a highly epoxidized shark oil having the characteristic values: acid number=0.8, hydroxyl number=65, esterification number=144.4, iodine number=13.9, epoxide oxygen content=4.7%.

Light colored and white glove leather was fat liquored with 3 to 4% of this mixture in the usual manner. The fat liquored leather had a god feel and fullness as well as excellent light fastness properties.

Example II

A dark colored, deacidified whale oil having the characteristic values: acid number=2.0, esterification number=154.8, hydroxyl number=17, iodine number=132.5, was epoxidized as described in Example I. A light yellow, low odor train oil epoxidate was obtained which had the following characteristic values: acid number=0, esterification number=155.2, hydroxyl number=19, iodine number=84.0, epoxide oxygen content=1.3%. This train oil was then sulfonated with 15% sulfuric acid under the conditions described in Example 1. The reaction product was admixed with triethanolamine until a pH value of 6.6 was reached.

The product thus obtained was admixed in a ratio of 2:1 with sulfated sperm oil. For fat liquoring of glove leather, apparel leather and shoe uppers, these leathers were fat liquored in a tub with an aqueous emulsion containing 5% of the fat liquoring agent mixture (based on the shaved weight). After drying, particularly soft, supple, light-fast leather with a good feel was obtained.

Example III

White or pastel colored, chrome-tanned glove leather made of lamb skins was fat liquored at 60° C. with 250% by weight of solution and 4 to 6% of a pure fat mixture consisting of:

35 parts by weight of air blown sulfited sperm oil epoxide
25 parts by weight of sulfated sperm oil epoxide neutralized with alkali
10 parts by weight of white oil 3.5 E 20° C.
30 parts by weight of highly epoxidized sperm oil having an epoxide oxygen content of 4.5%

The leather was then dried and finished in the usual manner. White and supple glove leather was obtained which had a full feel, good stretch properties and good light-fastness was obtained.

Example IV

Chrome-tanned, pastel colored apparel leather made of calf skin or cow hide were fat liquored at 60° C. for 45 minutes with 250% solution and 6 to 8% of a pure fat mixture of:

54 parts by weight of white oil 3.5–4.0 E 20° C.
40 parts by weight of sulfated oleic acid epoxide neutralized with alkali
6% of an ammonium salt mixture of alkyl sulfates $C_{12}$–$C_{18}$ After the usual drying and finishing, soft, light-fast apparel leather having a full feel was obtained.

Example V

Chrome-tanned shoe uppers made of cow hide which has been retanned with synthetic tanning agents or resin tanning agents were fat liquored at 60° C. for 45 minutes with:

250% solution and 4.5 to 5% of a pure fat mixture of 35 parts by weight of sulfated shark oil epoxide neutralized with alkali
2 parts by weight of an ammonium salt mixture of alkyl sulfates $C_{12}$–$C_{18}$
15 parts by weight of white oil 3.5–4.5 E 20° C.
45 parts by weight of highly epoxidized shark oil having an epoxide oxygen content of 4.7%

After the customary pasting drying process and finishing, a full, firm grained shoe upper leather with a good feel and good storage properties was obtained.

Example VI

An epoxidized fish oil (epoxide oxygen content 0.5%, iodine number 98.5, acid number 36.1) was phosphated with concentrated phosphoric acid for 3 hours at 18° C. and was subsequently neutralized with 20% potassium hydroxide accompanied by cooling.

The product thus obtained was used for fat liquoring soft uppers in the following manner:

250% solution 60° C.
5 to 6% of the above phosphotation product
Running time: 45 minutes The leather was dried in the usual manner and was then finished. Soft and supple uppers with a good feel was obtained.

Example VII

Beet oil with an epoxidation degree of 1.5% epoxide oxygen was sulfated with 8% by weight of 96% sulfuric acid at 28 to 30° C. The sulfation mixture was then stirred for 1½ hours. About 80% of the required neutralization agent in the form of a 5% ammonia solution were placed into a stirring vessel. The acid ester was then stirred slowly into the neutralization agent accompanied by mild cooling, so that the temperature did not rise above 30° C. The mixture was then allowed to stand at a pH of 4.0–4.5 for 10 to 12 hours at about 50° C. to permit separation of the salt water. The sulfation product was then cooled to 25–30° and was then adjusted to a pH of 6.5–7.0 with ammonia. A light brown oil was obtained which could readily be emulsified in water.

Chrome-tanned, pastel colored apparel leather made of calf skin or cow hide was fat liquored at 60° C. for 45 minutes with:

250% solution:
6–8% of a pure fat mixture consisting of—
85 parts by weight of the above beet oil epoxide sulfate
15 parts by weight of white oil 3.5–4.0 E 20° C.

Soft, supple apparel leather with a good feel and good light-fastness was obtained.

Example VIII

Partially epoxidized triolein with an epoxidation degree of 1.0 was sulfated with 15% of sulfuric acid for 1½ hours at 28–30° C. The acid ester was washed and neutralized as described in Example 2. A yellowish brown, water emulsifiable oil was obtained.

Retanned chrome uppers were fat liquored in the usual manner with:

4–5% of a mixture of:
    70 parts by weight of triolein epoxide sulfate
    30 parts by weight of highly epoxidized shark oil having an epoxide oxygen content of 4.7%

After the usual finishing treatment, light-fast uppers having a full feel and a good grain picture were obtained.

While we have set forth certain specific examples and preferred modes of practice of our invention, it will be understood that the invention is not limited thereto, and that various changes and modifications may be made in our invention without departing from the spirit of the disclosure and the scope of the appended claims.

We claim:

1. The method of fat liquoring fur skins and leather, which comprises contacting said skins and leather with an aqueous fat-liquor composition comprising the reaction product of epoxidized esters of higher fatty acids and alcohols with polybasic inorganic acids.

2. The method of claim 1 wherein said esters are derived from animal oils and waxes.

3. The method of claim 1 wherein said esters are derived from vegetable oils.

4. The method of claim 1 wherein said polybasic inorganic acids are selected from the group consisting of sulfuric, phosphoric and boric acids and salts thereof.

5. The method of fat liquoring fur skins and leather, which comprises contacting said skins and leather with an aqueous fat-liquor composition comprising the reaction product of epoxidized esters of unsaturated higher fatty acids and alcohols with polybasic inorganic acids.

6. The method of fat liquoring fur skins and leather, which comprises contacting said skins and leather with an aqueous fat-liquor composition comprising 2 to 25%, based on the weight of said skins and leather, of the reaction product of epoxidized esters of higher fatty acids and alcohols with polybasic inorganic acids.

7. The method of fat liquoring fur skins and leather, which comprises contacting said skins and leather with an aqueous fat-liquor composition comprising the reaction product of epoxidized esters of higher fatty acids and alcohols with polybasic inorganic acids and a highly epoxidized compound selected from the group consisting of oils, fats and waxes.

8. A fat liquor composition for fur skins and leather comprising an aqueous emulsion of the reaction product of epoxidized esters of higher fatty acids and alcohols with polybasic inorganic acids.

9. The composition of claim 8 wherein said esters are derived from animal oils and waxes.

10. The composition of claim 8 wherein said esters are derived from vegetable oils.

11. The composition of claim 8 wherein said polybasic acids are selected from the group consisting of sulfuric, phosphoric and boric acids and salts thereof.

12. A fat liquor composition for fur skins and leather comprising an aqueous emulsion of the reaction product of epoxidized esters of unsaturated higher fatty acids and alcohols with polybasic inorganic acids.

13. A fat liquor composition for fur skins and leather comprising an aqueous emulsion of 2 to 25%, based on the weight of said skins and leather, of the reaction product of epoxidized esters of higher fatty acids and alcohols with polybasic inorganic acids.

14. A fat liquor composition for fur skins and leather comprising an aqueous emulsion of the reaction products of epoxidized esters of higher fatty acids and alcohols with polybasic inorganic acids, and a highly epoxidized compound selected from the group consisting of oils, fats and waxes.

References Cited in the file of this patent

UNITED STATES PATENTS

| | | |
|---|---|---|
| 1,926,769 | Hailwood et al. | Sept. 12, 1933 |
| 2,023,768 | Ott et al. | Dec. 10, 1935 |
| 2,023,769 | Ott et al. | Dec. 10, 1935 |
| 2,466,393 | Dickey et al. | Apr. 5, 1949 |
| 2,892,673 | Heyden et al. | June 30, 1959 |
| 2,960,521 | Heyden | Nov. 15, 1960 |
| 2,965,657 | Findley | Dec. 20, 1960 |